United States Patent [19]

Shirota

[11] Patent Number: 5,018,807
[45] Date of Patent: May 28, 1991

[54] LENS SYSTEM FOR OPTICAL BEAM SCANNER

[75] Inventor: Hiroyuki Shirota, Kyoto, Japan

[73] Assignee: Dainippon Screen Mfg. Co., Ltd., Japan

[21] Appl. No.: 452,236

[22] Filed: Dec. 18, 1989

[30] Foreign Application Priority Data

Dec. 16, 1988 [JP] Japan .................... 63-319124

[51] Int. Cl.⁵ .................. G02B 26/08; G02B 9/60; G02B 9/34
[52] U.S. Cl. .................. 350/6.8; 350/6.5; 350/465; 350/469
[58] Field of Search ............. 350/6.5, 6-8, 350/6.1, 415, 465, 469; 250/234-236

[56] References Cited

U.S. PATENT DOCUMENTS

4,269,478  5/1981  Maeda et al. ............... 350/3.8
4,861,983  8/1989  Sasada et al. ............... 250/235
4,882,483  11/1989  Mochizuki et al. ........... 350/6.8
4,930,850  6/1990  Morimoto ................... 350/6.5

Primary Examiner—Bruce Y. Arnold
Assistant Examiner—James Phan
Attorney, Agent, or Firm—Ostrolenk, Faber, Gerb & Soffen

[57] ABSTRACT

The present invention is directed to a lens system for an optical beam scanner which scans a plurality of optical beams. The lens system comprises: a first lens group having an entrance pupil, which includes first and third lenses in the form of meniscus having a positive power, respectively, a fourth lens having a positive power, and a second lens having a negative power; and a second lens group including a fifth lens having a positive power. The first to fifth lenses are successively disposed in order from the entrance pupil side. Accordingly, the lens system has a telecentric and an f-sinθ characteristic.

3 Claims, 8 Drawing Sheets

FNO.20

−0.2　0　0.2

SPHERICAL ABERRATION

ASTIGMATISM

−0.1　0　0.1 f−sinθ CHARACTERISTIC (%)

FIG. 8A

FNO.20

−0.2　0　0.2

SPHERICAL ABERRATION

ASTIGMATISM

−0.1　0　0.1 f−sinθ CHARACTERISTIC (%)

FIG.9A

SPHERICAL ABERRATION

FIG.9B

ASTIGMATISM

FIG.9C f-sin θ CHARACTERISTIC (%)

FIG.10A

SPHERICAL ABERRATION

FIG.10B

ASTIGMATISM

FIG.10C f-sin θ CHARACTERISTIC (%)

FIG. 11A

SPHERICAL ABERRATION

FIG. 11B

ASTIGMATISM

FIG. 11C f-sin θ CHARACTERISTIC (%)

FIG. 12A

SPHERICAL ABERRATION

FIG. 12B

ASTIGMATISM

FIG. 12C f-sin θ CHARACTERISTIC (%)

FIG. 13A

SPHERICAL ABERRATION

FIG. 13B

ASTIGMATISM

FIG. 13C f-sin θ CHARACTERISTIC (%)

FIG. 14

LENS SYSTEM FOR OPTICAL BEAM SCANNER

BACKGROUND OF THE INVENTION

1. Field of the Invention

The present invention relates to a lens system, and more particularly, to a lens system which is applied to an optical beam scanner, such as a laser printer, which scans a plurality of optical beams on a recording surface.

2. Description of the Prior Art

Japanese Patent Laying-Open Gazettes Nos. 195211/1984 and 267910/1988 disclose lens systems which can be applied to an optical beam scanner such as a laser printer, respectively.

Figure 1:
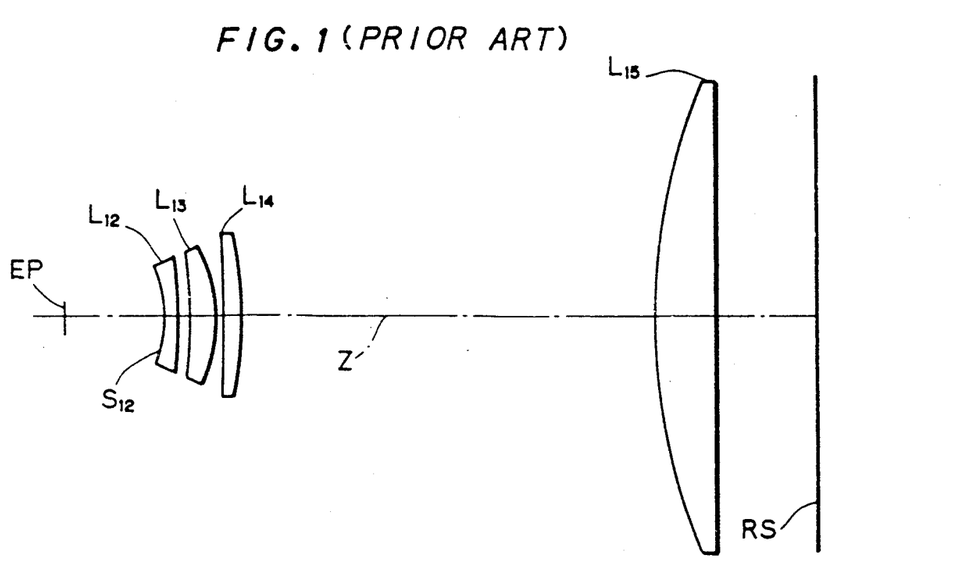
FIG. 1 illustrates the structure of a conventional telecentric f-$\theta$ lens system.

FIG. 1 illustrates the structure of a conventional telecentric f-$\theta$ lens system, which is disclosed in the former gazette Japanese Patent Laying-Open Gazette No. 195211/1984). As shown in FIG. 1, the conventional telecentric f-$\theta$ lens system is formed with a negative meniscus lens $L_{12}$ whose concave surface $S_{12}$ is directed toward an entrance pupil EP, positive meniscus lenses $L_{13}$ and $L_{14}$ and a positive plano-convex lens $L_{15}$, and these lenses $L_{12}$ to $L_{15}$ are arranged in order from the entrance pupil EP side toward a recording surface RS side.

The aforementioned lens system satisfies:

$$h = f \cdot \theta$$

assuming that $\underline{h}$ represents a distance from an optical axis Z of the lens system to a beam spot on the recording surface RS, f represents the focal length of the lens system and $\theta$ represents an incident angle of the beam upon the lens system. A laser beam is generally deflected by a polygon mirror, so that the laser beam is impinged on the recording surface RS through the lens system. Since the polygon mirror is rotated at a constant angular velocity, the beam spot moves on the recording surface RS at a constant speed.

Further, the lens system has a telecentric characteristic that all principal rays substantially vertically enter the recording surface RS, so that an image size in a main scanning direction does not vary even if the recording surface RS is displaced in the direction of the optical axis Z, for example, as is well known in the art.

Therefore, a telecentric f-$\theta$ lens system is employed in a laser printer etc. particularly requiring that a laser beam is projected onto the recording surface in high accuracy.

Figure 2:
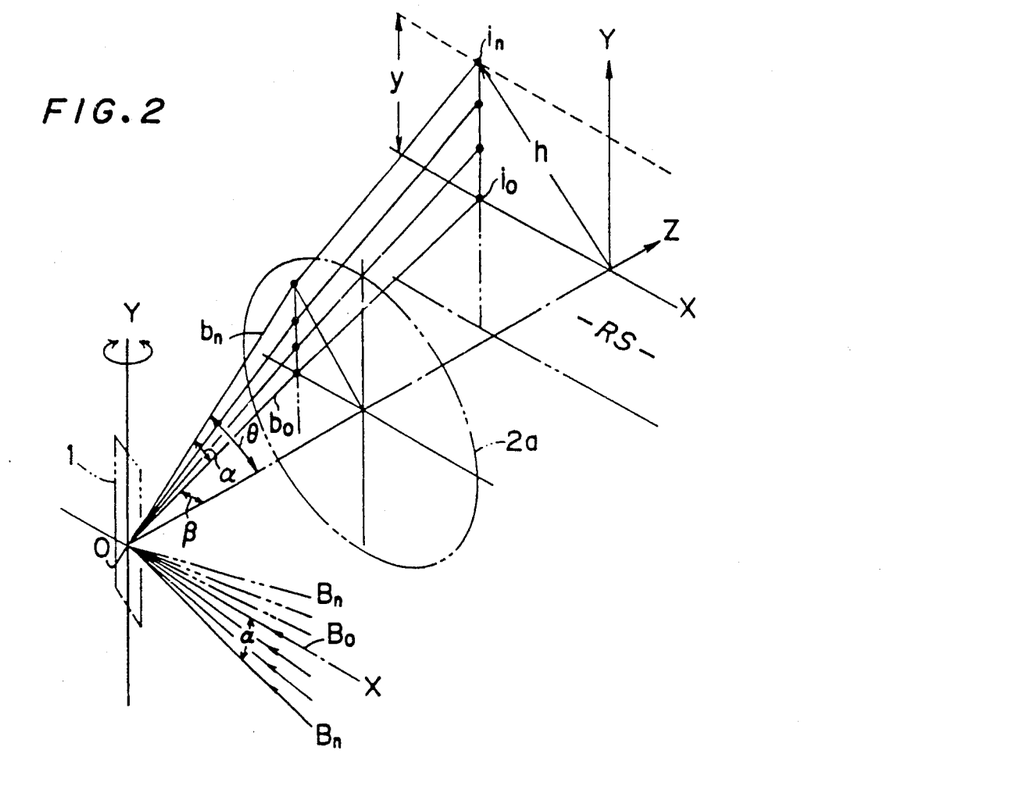
FIG. 2 is a schematic illustration of optical paths deflected by a deflector.

FIG. 2 shows a schematic illustration of the optical path deflected by a deflector 1. A plurality of laser beams $B_0$ to $B_n$ are projected onto a point O of the deflector 1 which rotates in the forward and reverse directions around a Y-axis, while laser beams $b_0$ to $b_n$ deflected by the deflector 1 are directed toward a recording surface RS (X-Y plane) through a lens system $2a$. In the figure, symbols $i_0$ to $i_n$ represent beam spots of the laser beams $b_0$ to $b_n$ on the recording surface RS, respectively.

In the case that an f-$\theta$ lens system shown in FIG. 1 is employed as the lens system $2a$, the following equation is obtained:

$$y = f \cdot \tan^{-1} \sqrt{\frac{\tan^2\alpha}{\cos^2\beta} + \tan^2\beta} \cdot \sin\left(\tan^{-1} \frac{\tan\alpha}{\sin\beta}\right)$$

Where y is a distance between the beam spots $i_0$ and $i_n$, f is a focal length of the f-$\theta$ lens system $2a$, $\alpha$ is an angle between the laser beam $B_n$ and an optical axis X, and $\beta$ is an angle between the laser beam $b_0$ and an optical axis Z of the f-$\theta$ lens system $2a$.

Figure 3:
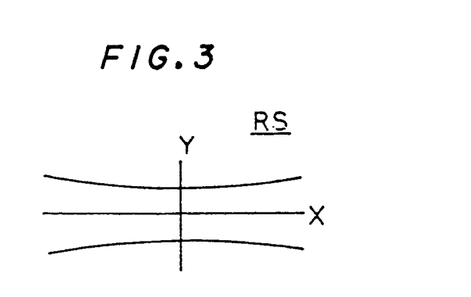
FIG. 3 is a diagram showing a scanning locus made by the telecentric f-$\theta$ lens system where a plurality of optical beams are applied.

When the deflector 1 rotates around the Y-axis, the angle $\beta$ varies corresponding to the rotation of the deflector 1, whereby the distance y varies with the angle $\beta$. Therefore, the locus of the laser beams focusing on the recording surface RS by the f-$\theta$ lens system $2a$ will not straight as shown in FIG. 3, so that the quality of an image recording on the recording surface RS is lowered.

Figure 4:
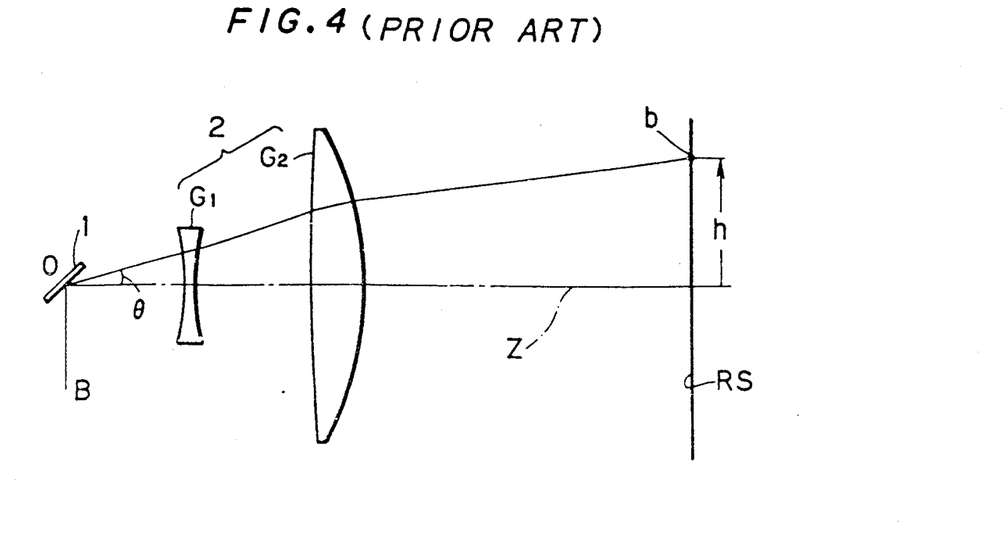
FIG. 4 illustrates the structure of a conventional f-sin$\theta$ lens system.

FIG. 4 illustrates the structure of an f-$\sin\theta$ lens system, which is disclosed in latter gazette (Japanese Patent Laying-Open Gazette No. 267910/1988). As shown in FIG. 4, the f-$\sin\theta$ lens system is formed with a first lens group $G_1$ having a negative focal length and a second lens group $G_2$ having a positive focal length, to satisfy:

$$h = f \cdot \sin\theta$$

where h is a distance between an optical axis Z of the f-$\sin\theta$ lens system and a beam spot b on a recording surface RS, f is a focal length of the f-$\sin\theta$ lens system and $\theta$ is an incident angle that the optical beam entering the lens system forms with respect to the optical axis Z thereof.

In the case that the f-$\sin\theta$ lens system 2 is used instead of the lens system $2a$ as shown in FIG. 2, the following equation is obtained:

$$y = f \cdot \sin\alpha$$

As understood the above equation, the distance y is a constant even if the deflector 1 rotates in the forward and reverse direction around the Y-axis. Therefore, the loci of the plural laser beams will be straight as shown in FIG. 5, when the laser beams are directed to the recording surface RS through the f-$\sin\theta$ lens system.

Figure 5:
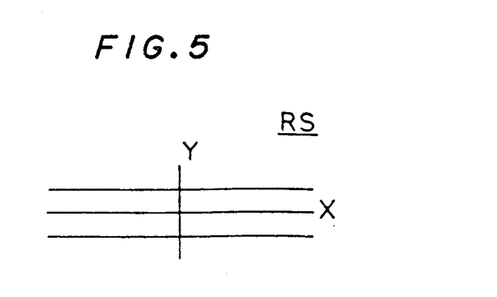
FIG. 5 is a diagram showing a scanning locus made by the f-sin$\theta$ lens system where a plurality of optical beams are applied.

However, the f-$\sin\theta$ lens system shown in FIG. 5 has no telecentric characteristic, so that an image size in a main scanning direction varies with the displacement of the recording surface RS in the direction of the optical axis Z of the f-$\sin\theta$ lens system. Therefore, the lens system can't be employed in the optical beam scanner such as a laser printer requiring that the image can be recorded on the recording surface RS in high accuracy.

SUMMARY OF THE INVENTION

The present invention is directed to a lens system for an optical beam scanner which scans a plurality of optical beams on a recording surface. The lens system comprises: (a) a first lens group having an entrance pupil, which includes (a-1) a first lens in the form of meniscus having a positive power and having a concave surface which is directed to the entrance pupil, (a-2) a second lens having a negative power, (a-3) a third lens in the form of meniscus having a positive power, and a fourth lens having positive power; and (b) a second lens group including a fifth lens having a positive power.

Further, the first through fifth lenses are successively disposed in order from the entrance pupil side.

In an aspect of the present invention, the above lens system satisfies following:

$$0.6 < (r_2/r_3) \leq 2.1$$

$$-0.43 < (f_2/f) < -0.21$$

$$1.3 < (f_5/f) \leq 2.6$$

where $r_2$ is a radius of curvature of a surface of the first lens, which is directed to the recording surface; $r_3$ is a radius of curvature of a surface of the second lens, which is directed to the entrance pupil; $f_2$ is a focal length of the second lens; $f_5$ is a focal length of the fifth lens; and $f$ is a focal length of the lens system.

Further, the present invention is directed to an optical beam scanner for scanning a plurality of optical beams on a recording surface. The optical beam scanner comprises: a light source for generating the plurality of optical beams; a deflector for deflecting the optical beams outgoing from the light source; and a lens system for imaging the optical beams deflected by the deflector on the recording surface. The lens system comprises: (a) a first lens group having an entrance pupil, which includes (a−1) a first lens in the form of meniscus having a positive power and having a concave surface which is directed to the entrance pupil, (a−2) a second lens having a negative power, (a−3) a third lens in the form of meniscus having a positive power, and a fourth lens having positive power; and (b) a second lens group including a fifth lens having a positive power. Further, the first through fifth lenses are successively disposed in order from the entrance pupil side.

A principal object of the present invention is to provide a lens system which has a telecentric property and an excellent f-sin$\theta$ characteristic.

Another object of the present invention is to provide an optical beam scanner which can scan the plurality of optical beams on the recording surface in high accuracy while improving a quality of an image formed on the recording surface.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is applied.

DESCRIPTION OF THE PREFERRED EMBODIMENTS

Figure 6:
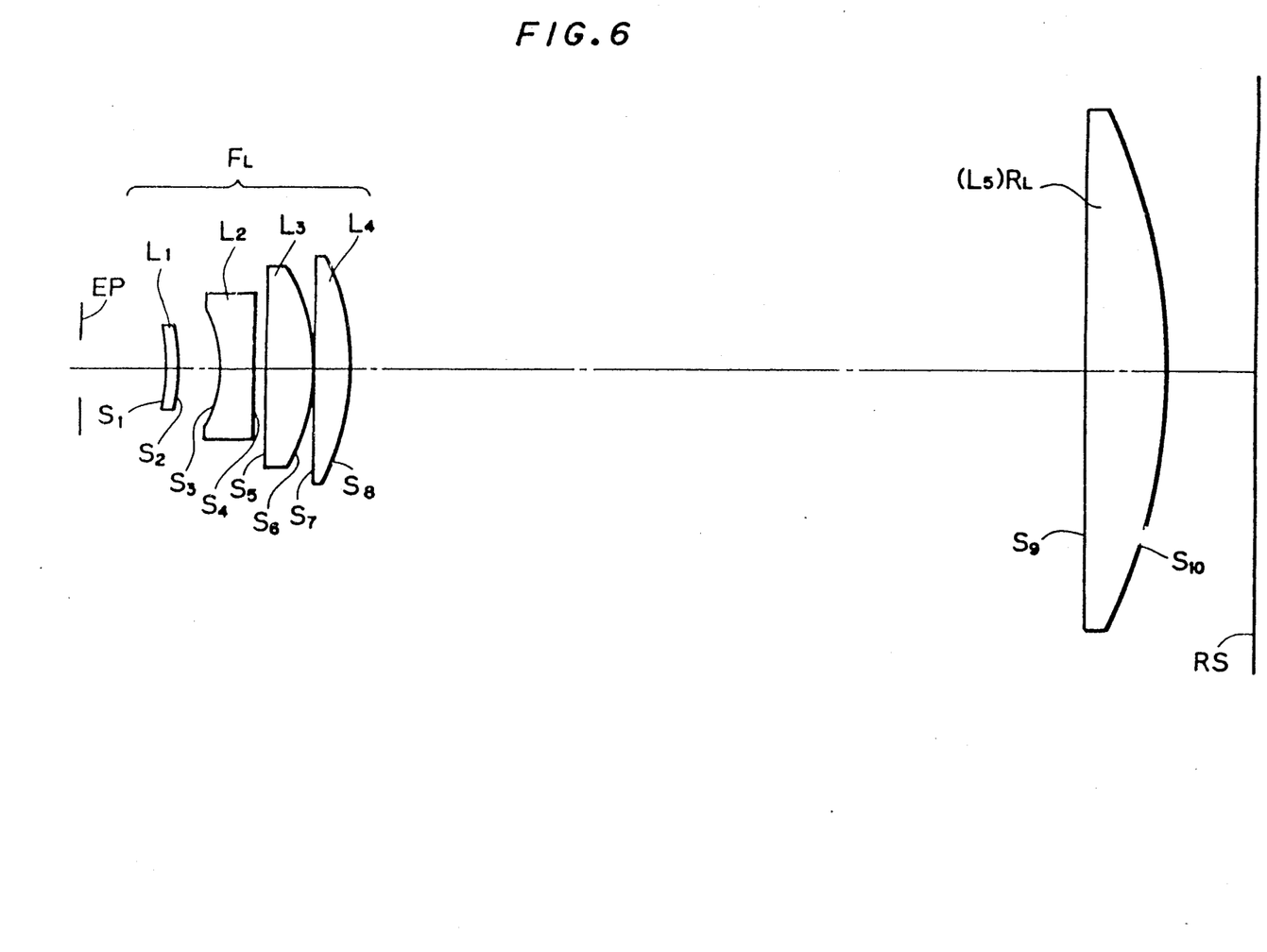
FIG. 6 illustrates a preferred embodiment of a lens system according to the present invention.

FIG. 6 illustrates a preferred embodiment of a lens system according to the present invention. The lens system is formed with a rear lens group $R_L$ and a front lens group $F_L$, which are arranged in order from a recording surface RS side at a prescribed interval.

The front lens group $F_L$ is formed with first, third and fourth meniscus lenses $L_1$, $L_3$ and $L_4$ having positive power and a second lens $L_2$ having negative power, as shown in FIG. 6. The first to fourth lenses $L_1$ to $L_4$ are arranged in order from an entrance pupil EP side at prescribed intervals, while all of concave surfaces $S_1$, $S_3$, $S_5$ and $S_7$ of the first to fourth lenses $L_1$ to $L_4$ are directed toward the entrance pupil EP.

On the other hand, the rear lens group $R_L$ is formed with a fifth lens $L_5$ having positive power, and a convex surface $S_{10}$ of the fifth lens $L_5$ is directed toward the recording surface RS.

The lens system having the aforementioned structure satisfies:

$$0.6 < (r_2/r_3) \leq 2.1 \qquad (1)$$

$$-0.43 < (f_2/f) < -0.21 \qquad (2)$$

$$1.3 < (f_5/f) \leq 2.6 \qquad (3)$$

where $r_2$ is a radius of curvature of a surface $S_2$ of the first lens $L_1$, which is directed toward the recording surface RS; $r_3$ is a radius of curvature of the surface $S_3$ of the second lens $L_2$; $f_2$ is a focal length of the second lens $L_2$; $f_5$ is a focal length of the fifth lens $L_5$; and $f$ is a focal length of the lens system.

The inequality (1) shows the condition for correcting the spherical aberration, astigmatism and curvature of image surface. That is, when the value $(r_2/r_3)$ is not more that 0.6, both of the meridional and sagittal image surfaces are inclined toward the negative (−) side while correction of the spherical aberration is insufficient. When value $(r_2/r_3)$ is more than 2.1, the spherical aberration is excessively corrected while the meridional image surface is inclined toward the positive (+) side, whereby astigmatism at an end of a field angle is increased. Further, the f-sinθ characteristic is degraded also.

The inequality (2) shows the condition for the curvature of image surface. That is, when the value ($f_2/f$) is not more than $-0.43$, the curvature of the sagittal image surface is increased. When the value ($f_2/f$) is not less than $-0.21$, both of the meridional and sagittal image surfaces are inclined toward the negative (−) side.

The inequality (3) shows the condition for the curvature of image surface and the condition that the lens system has a telecentric property. That is, when the value ($f_5/f$) is not more that 1.3, the meridional image surface is inclined toward the negative (−) side while the telecentric characteristic is degraded. On the other hand, when the value ($f_5/f$) is more than 2.6, the sagittal image surface is inclined in spite of improving the telecentric characteristic of the lens system.

When, to the contrary, a lens system is formed with the first to fifth lenses $L_1$ to $L_5$ and the lens system satisfies the inequality (1) to (3) (Examples 1 to 8 described below), the lens system which has both of telecentric and f-sinθ characteristics can be obtained, which further has the following characteristics;
(1) F-number is not more than 20;
(2) spherical aberration, astigmatism etc. are small; and
(3) image surface is flat.

Example 1

Table 1 shows lens data of a first example according to a lens system structured along FIG. 6.

TABLE 1

| i | $r_i$ | $d_i$ | $n_i$ |
|---|---|---|---|
| 1 | −23.26 | 1.72 | 1.77861 |
| 2 | −20.56 | 7.61 | |
| 3 | −17.10 | 5.00 | 1.61655 |
| 4 | −186.05 | 1.90 | |
| 5 | −105.55 | 7.92 | 1.77861 |
| 6 | −35.28 | 0.12 | |
| 7 | −106.55 | 6.00 | 1.77861 |
| 8 | −41.31 | 122.10 | |
| 9 | ∞ | 13.59 | 1.51462 |
| 10 | −98.17 | | |

Referring to Table 1, symbol $r_i$ (i=1, 2, ..., 10) represents radius of curvature of lens surfaces $S_i$, such that $r_1$ represents the radius of curvature of the concave surface $S_1$ of the first lens $L_1$ and $r_2$ represents the radius of curvature of the convex surface $S_2$ thereof directed toward the recording surface, for example. Symbol $d_i$ (i=1, 3, 5, 7, 9) represents thickness values of the first to fifth lenses $L_1$ to $L_5$, respectively. On the other hand, $d_i$ (i=2, 4, 6, 8) represents spaces between pairs of the first to fifth lenses $L_1$ to $L_5$, respectively, such that $d_2$ represents the space between the first and second lenses $L_1$ and $L_2$, for example. Symbol $n_i$ (i=1, 3, 5, 7, 9) represents indexes of refraction of the first to fifth lenses $L_1$ to $L_5$ with respect to a line d (587.6 nm).

The focal length f, the F-number $F_{NO}$ etc. of the lens system having the aforementioned lens data are set as shown in Table 2.

TABLE 2

| f | $F_{NO}$ | λ | $d_0$ |
|---|---|---|---|
| 100.00 | 20.00 | 632.8 nm | 10.00 |

Referring to Table 2, λ represents a wavelength of a laser beam, and $d_0$ represents a space between the entrance pupil EP and the concave surface $S_1$ of the first lens $L_1$. The focal length $f_2$, $f_5$ of the second and fifth lens $L_2$, $L_5$ is −30.9, 190.8, respectively, although this is not shown in Tables 1 and 2.

Thus, $$f_2/f_5 = 1.202$$

$$f_2/f = -0.309$$

$$f_5/f = 1.908$$

and it is apparent that the lens system satisfies the inequalities (1) to (3).

Figure 7A:
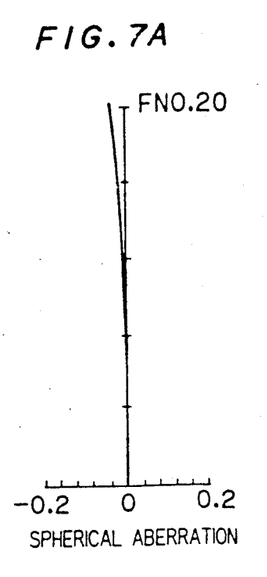
FIGS. 7A, 7B and 7C illustrate spherical aberration, astigmatism and f-sin$\theta$ characteristic of a first example, respectively.
Figure 7B:
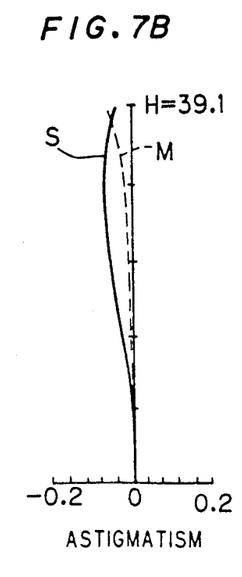
Figure 7C:
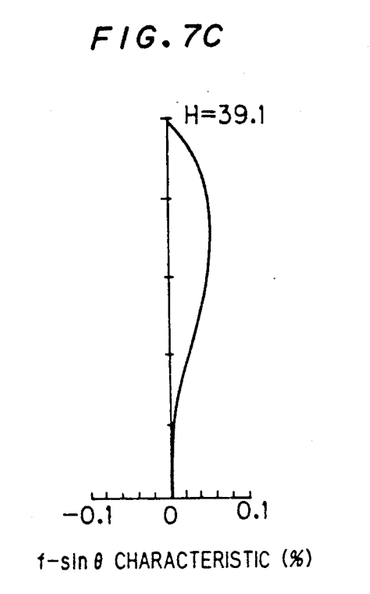

FIGS. 7A, 7B and 7C illustrate spherical aberration, astigmatism and f-sinθ characteristic of the lens system having the aforementioned structure respectively. The results shown in these figures and FIGS. 8A-13A, 8B-13B and 8C-13C, which are hereinafter described in detail, have been obtained with respect to light of 632.8 nm in wavelength.

In each of FIG. 7B and FIGS. 8B, 9B, 10B, 11B, 12B and 13B, symbol S denotes a sagittal image surface and symbol M denotes a meridional image surface, respectively. The f-sinθ characteristic shown in each of FIGS. 7C, 8C, 9C, 10C, 11C, 12C and 13C is obtained by the following equation in which θ represents an angle of incidence of the optical beam upon the lens system and h represents a distance between a beam spot on a recording surface and an optical axis of the lens system:

$$f\text{-sin}\theta \text{ characteristic} = \frac{h - f \cdot \sin\theta}{f \cdot \sin\theta} \cdot 100 \, (\%) \quad (4)$$

Example 2

Table 3 shows lens data of a second example according to the lens system.

TABLE 3

| i | $r_i$ | $d_i$ | $n_i$ |
|---|---|---|---|
| 1 | −10.50 | 1.05 | 1.77861 |
| 2 | −10.85 | 14.59 | |
| 3 | −17.90 | 1.00 | 1.61655 |
| 4 | −201.87 | 1.27 | |
| 5 | −60.73 | 3.31 | 1.77861 |
| 6 | −30.68 | 0.10 | |
| 7 | −456.16 | 5.50 | 1.77861 |
| 8 | −35.92 | 106.99 | |
| 9 | ∞ | 12.68 | 1.51462 |
| 10 | −104.67 | | |

The focal length f, the F-number $F_{NO}$ etc. of the lens system having the aforementioned lens data are set as shown in Table 4.

TABLE 4

| f | $F_{NO}$ | λ | $d_0$ |
|---|---|---|---|
| 100.00 | 20.00 | 632.8 nm | 11.00 |

The focal length $f_2$, $f_5$ of the second and fifth lens $L_2$, $L_5$ is $-31.9$, $203.4$, respectively, although this is not shown in Tables 3 and 4.

Thus, $$r_2/r_3 = 0.606$$

$$f_2/f = -0.319$$

$$f_5/f = 2.034$$

and it is apparent that the lens system satisfies the inequalities (1) to (3).

Figure 8A:
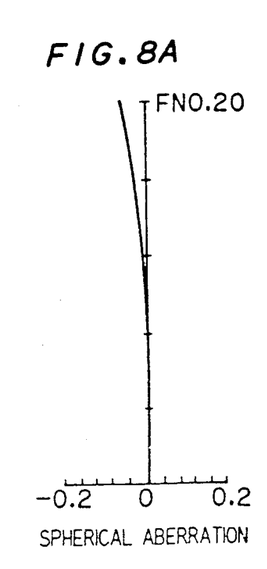
FIGS. 8A, 8B and 8C illustrate spherical aberration, astigmatism and f-sin$\theta$ characteristic of a second example, respectively.
Figure 8B:
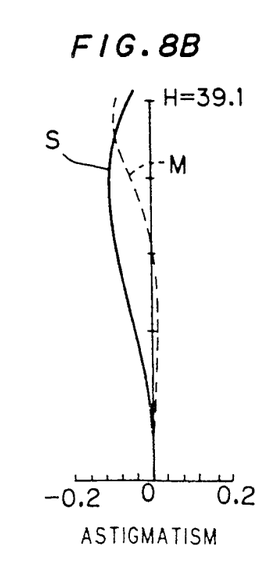
Figure 8C:
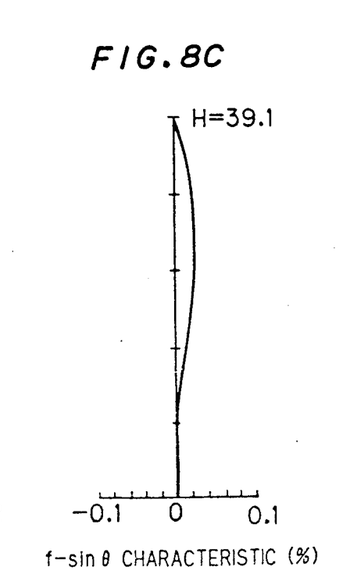

FIGS. 8A, 8B and 8C illustrate spherical aberration, astigmatism and f-sin$\theta$ characteristic of the lens system having the aforementioned structure, respectively.

Example 3

Table 5 shows lens data of a third example according to the lens system.

TABLE 5

| i | $r_i$ | $d_i$ | $n_i$ |
|---|-------|-------|-------|
| 1 | −48.13 | 3.24 | 1.77861 |
| 2 | −40.23 | 10.45 | |
| 3 | −19.16 | 1.00 | 1.61655 |
| 4 | −367.82 | 1.74 | |
| 5 | −42.17 | 6.94 | 1.77861 |
| 6 | −32.79 | 0.10 | |
| 7 | −277.62 | 5.56 | 1.77861 |
| 8 | −34.20 | 117.36 | |
| 9 | ∞ | 14.00 | 1.51462 |
| 10 | −94.57 | | |

The focal length f, the F-number $F_{NO}$ etc. of the lens system having the aforementioned lens data are set as shown in Table 6.

TABLE 6

| f | $F_{NO}$ | λ | $d_0$ |
|---|----------|---|-------|
| 100.00 | 20.00 | 632.8 nm | 10.10 |

The focal length $f_2$, $f_5$ of the second and fifth lens $L_2$, $L_5$ is $-32.8$, $183.8$, respectively, although this is not shown in Tables 5 and 6.

Thus, $$r_2/r_3 = 2.100$$

$$f_2/f = -0.328$$

$$f_5/f = 1.838$$

and it is apparent that the lens system satisfies the inequalities (1) to (3).

Figure 9A:
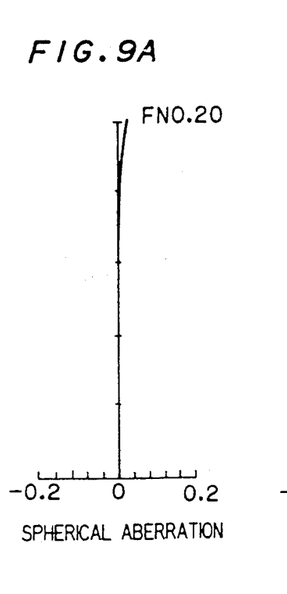
FIGS. 9A, 9B and 9C illustrate spherical aberration, astigmatism and f-sin$\theta$ characteristic of a third example, respectively.
Figure 9B:
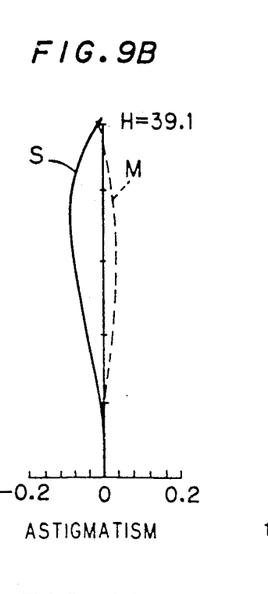
Figure 9C:
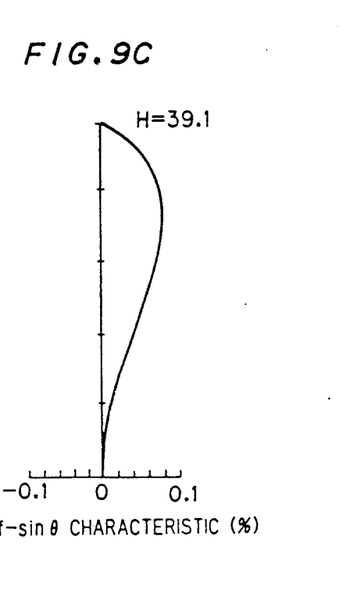

FIGS. 9A, 9B and 9C illustrate spherical aberration, astigmatism and f-sin$\theta$ characteristic of the lens system having the aforementioned structure, respectively.

Example 4

Table 7 shows lens data of a fourth example according to the lens system.

TABLE 7

| i | $r_i$ | $d_i$ | $n_i$ |
|---|-------|-------|-------|
| 1 | −36.40 | 1.55 | 1.77861 |
| 2 | −17.70 | 1.82 | |
| 3 | −14.32 | 5.00 | 1.61655 |
| 4 | −160.77 | 2.16 | |
| 5 | −586.93 | 5.11 | 1.77861 |
| 6 | −382.79 | 2.87 | |
| 7 | −385.16 | 9.44 | 1.77861 |
| 8 | −31.13 | 121.82 | |
| 9 | ∞ | 13.40 | 1.51462 |
| 10 | −98.98 | | |

The focal length f, the F-number $F_{NO}$ etc. of the lens system having the aforementioned lens data are set as shown in Table 8.

TABLE 8

| f | $F_{NO}$ | λ | $d_0$ |
|---|----------|---|-------|
| 100.00 | 20.00 | 632.8 nm | 10.00 |

The focal length $f_2$, $f_5$ of the second and fifth lens $L_2$, $L_5$ is $-21.1$, $192.3$, respectively, although this is not shown in Tables 7 and 8.

Thus, $$r_2/r_3 = 1.240$$

$$f_2/f = -0.211$$

$$f_5/f = 1.923$$

and it is apparent that the lens system satisfies the inequalities (1) to (3).

Figure 10A:
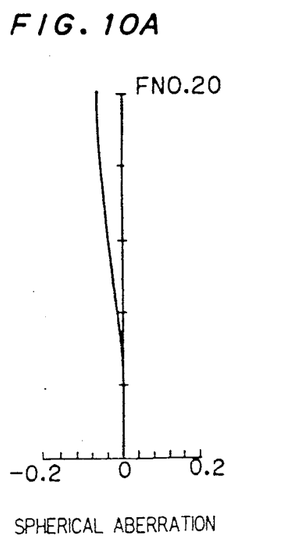
FIGS. 10A, 10B and 10C illustrate spherical aberration, astigmatism and f-sin$\theta$ characteristic of a fourth example, respectively.
Figure 10B:
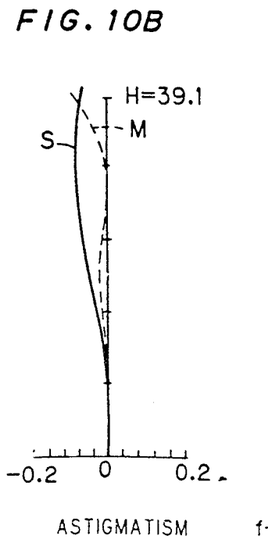
Figure 10C:
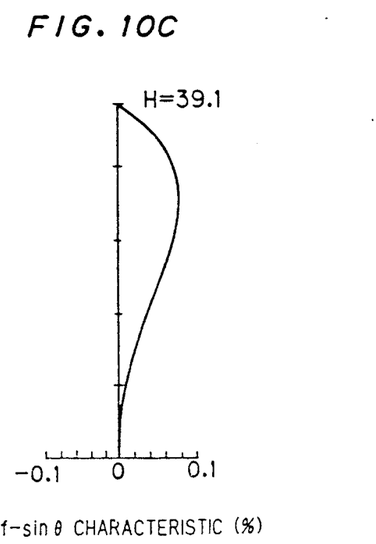

FIGS. 10A, 10B and 10C illustrate spherical aberration, astigmatism and f-sin$\theta$ characteristic of the lens system having the aforementioned structure, respectively.

Example 5

Table 9 shows lens data of a fifth example according to the lens system.

TABLE 9

| i | $r_i$ | $d_i$ | $n_i$ |
|---|-------|-------|-------|
| 1 | −20.74 | 3.38 | 1.77861 |
| 2 | −20.90 | 10.83 | |
| 3 | −26.41 | 5.00 | 1.61655 |
| 4 | 5376.85 | 0.89 | |
| 5 | −120.05 | 6.91 | 1.77861 |
| 6 | −49.76 | 0.10 | |
| 7 | −711.00 | 3.45 | 1.77861 |
| 8 | −62.41 | 67.82 | |
| 9 | ∞ | 9.46 | 1.51462 |
| 10 | −87.80 | | |

The focal length f, the F-number $F_{NO}$ etc. of the lens system having the aforementioned lens data are set as shown in Table 10.

TABLE 10

| f | $F_{NO}$ | λ | $d_0$ |
|---|----------|---|-------|
| 100.00 | 20.00 | 632.8 nm | 10.00 |

The focal length $f_2$, $f_5$ of the second and fifth lens $L_2$, $L_5$ is $-42.6$, $170.6$, respectively, although this is not shown in Tables 9 and 10.

Thus, $f_4/f = 0.791$ $f_2/f = -0.426$ $f_5/f = 1.706$ and it is apparent that the lens system satisfies the inequalities (1) to (3).

Figure 11A:
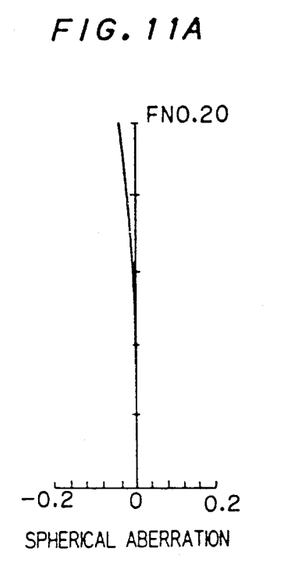
FIGS. 11A, 11B and 11C illustrate spherical aberration, astigmatism and f-sin$\theta$ characteristic of a fifth example, respectively.
Figure 11B:
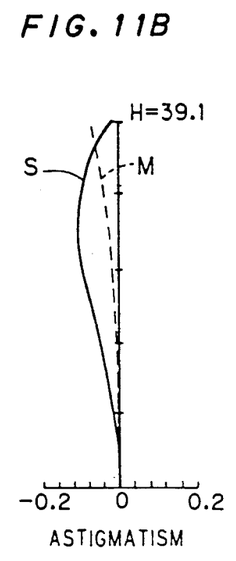
Figure 11C:
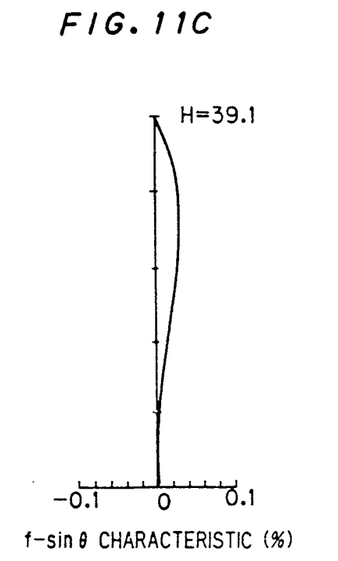

FIGS. 11A, 11B and 11C illustrate spherical aberration, astigmatism and f-sin$\theta$ characteristic of the lens system having the aforementioned structure, respectively.

Example 6

Table 11 shows lens data of a sixth example according to the lens system.

TABLE 11

| i | $r_i$ | $d_i$ | $n_i$ |
|---|---|---|---|
| 1 | −19.75 | 3.40 | 1.77861 |
| 2 | −20.13 | 13.96 | |
| 3 | −25.84 | 5.00 | 1.61655 |
| 4 | 550.00 | 1.18 | |
| 5 | −132.38 | 2.84 | 1.77861 |
| 6 | −50.21 | 0.10 | |
| 7 | −190.57 | 3.50 | 1.77861 |
| 8 | −51.97 | 46.55 | |
| 9 | ∞ | 11.26 | 1.51462 |
| 10 | −68.45 | | |

The focal length f, the F-number $F_{NO}$ etc. of the lens system having the aforementioned lens data are set as shown in Table 12.

TABLE 12

| f | $F_{NO}$ | λ | $d_0$ |
|---|---|---|---|
| 100.00 | 20.00 | 632.8 nm | 10.00 |

The focal length $f_2$, $f_5$ of the second and fifth lens $L_2$, $L_5$ is −39.9, 133.0, respectively, although this is not shown in Tables 11 and 12.

Thus, $f_4/f = 0.779$ $f_2/f = -0.399$ $f_5/f = 1.330$ and it is apparent that the lens system satisfies the inequalities (1) to (3).

Figure 12A:
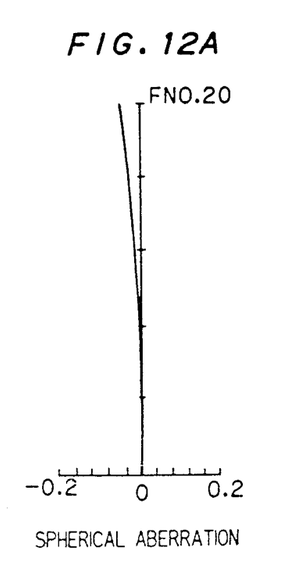
FIGS. 12A, 12B and 12C illustrate spherical aberration, astigmatism and f-sin$\theta$ characteristic of a sixth example, respectively.
Figure 12B:
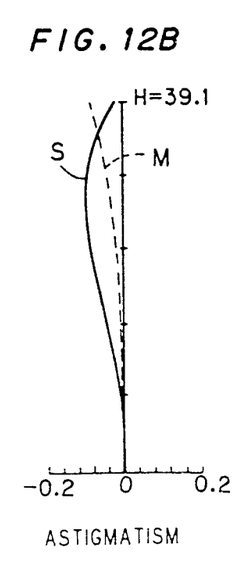
Figure 12C:
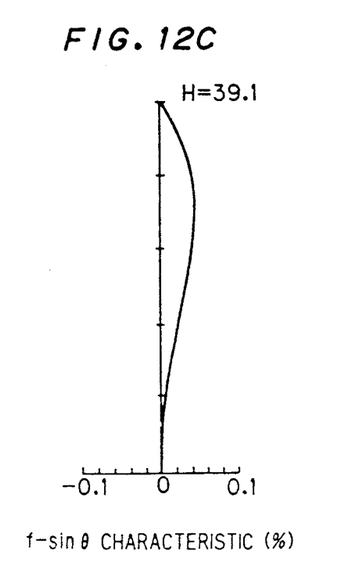

FIGS. 12A, 12B and 12C illustrate spherical aberration, astigmatism and f-sin$\theta$ characteristic of the lens system having the aforementioned structure, respectively.

Example 7

Table 13 shows lens data of a seventh example according to the lens system.

TABLE 13

| i | $r_i$ | $d_i$ | $n_i$ |
|---|---|---|---|
| 1 | −29.65 | 3.73 | 1.77861 |
| 2 | −19.96 | 1.63 | |
| 3 | −18.02 | 5.00 | 1.61655 |
| 4 | 210.58 | 1.40 | |
| 5 | −174.83 | 6.02 | 1.77861 |

TABLE 13-continued

| i | $r_i$ | $d_i$ | $n_i$ |
|---|---|---|---|
| 6 | −60.44 | 8.26 | |
| 7 | 9052.20 | 4.56 | 1.77861 |
| 8 | −47.50 | 124.12 | |
| 9 | ∞ | 10.81 | 1.51462 |
| 10 | −133.80 | | |

The focal length f, the F-number $F_{NO}$ etc. of the lens system having the aforementioned lens data are set as shown in Table 14.

TABLE 14

| f | $F_{NO}$ | λ | $d_0$ |
|---|---|---|---|
| 100.01 | 20.00 | 632.8 nm | 10.00 |

The focal length $f_2$, $f_5$ of the second and fifth lens $L_2$, $L_5$ is −26.7, 260.0, respectively, although this is not shown in Tables 13 and 14.

Thus, $f_4/f = 1.108$ $f_2/f = -0.267$ $f_5/f = 2.600$ and it is apparent that the lens system satisfies the inequalities (1) to (3).

Figure 13A:
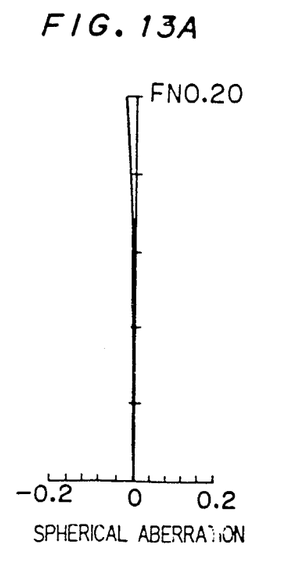
FIGS. 13A, 13B and 13C illustrate spherical aberration, astigmatism and f-sin$\theta$ characteristic of a seventh example, respectively
Figure 13B:
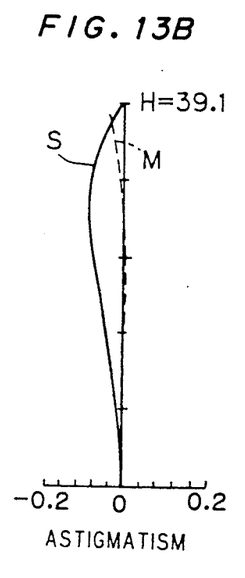
Figure 13C:
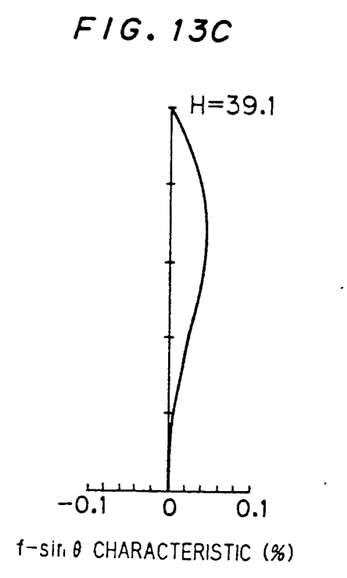

FIGS. 13A, 13B and 13C illustrate spherical aberration, astigmatism and f-sin$\theta$ characteristic of the lens system having the aforementioned structure, respectively.

The spherical aberration of the lens system is extremely small as understood from the spherical aberration diagrams (FIGS. 7A, 8A, 9A, 10A, 11A, 12A, and 13A), and the astigmatism thereof is also extremely small as understood from the astigmatism diagrams (FIGS. 7B, 8B, 9B, 10B, 11B, 12B, and 13B). Further, the lens system structured as above has an excellent f-sin$\theta$ characteristic, as understood from the f-sin$\theta$ characteristic diagrams (FIGS. 7C, 8C, 9C, 10C, 11C, 12C and 13C).

Further, all the F-numbers $F_{NO}$ of the lens systems are not more than 20 in Examples 1 to 7, as hereinabove described.

Figure 14:
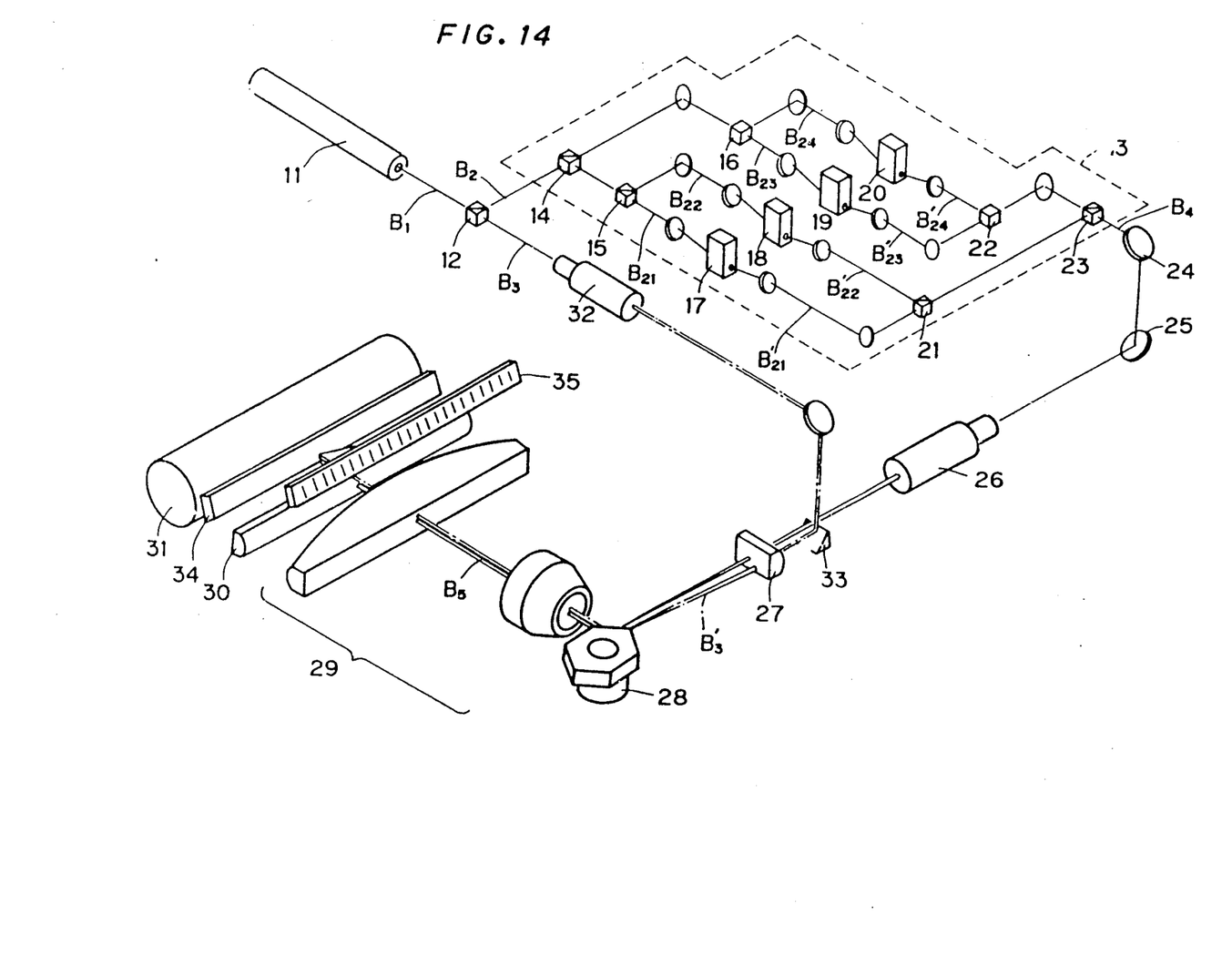
FIG. 14 is a perspective view showing an optical system of an optical beam scanner to which the lens system structured along

FIG. 14 is a perspective view showing an optical system of an optical beam scanner, which scans a plurality of laser beams on a recording surface, to which the aforementioned lens system can be applied. Referring to FIG. 14, a laser beam $B_1$ outgoing from a laser tube 11 is projected onto a non-polarizing beam splitter 12, to be divided into a scanning beam $B_2$ and a reference beam $B_3$.

The scanning beam $B_2$ reflected by the beam splitter 12 enters an optical modulator system 13 for dividing the scanning beam $B_2$ into a plurality of laser beams and individually modulating the plurality of laser beams in response to image signals being inputted into the optical modulator system 13. The optical modulator system 13 includes a non-polarizing beam splitter 14 and two polarizing beam splitters 15, 16 so as to divide the scanning beam $B_2$ into four laser beams $B_{21}$, $B_{22}$, $B_{23}$, $B_{24}$. The scanning beam $B_2$ is divided into two laser beams by the beam splitter 14, and then the two laser beams are directed to the beam splitter 15, 16, respectively. The laser beam entering the beam splitter 15 is divided into two laser beams $B_{21}$, $B_{22}$ while the laser beam entering the beam splitter 16 is divided into two laser beam $B_{23}$, $B_{24}$, so that the four laser beams $B_{21}$, $B_{22}$, $B_{23}$, $B_{24}$ then enter optical modulation elements (e.g. acoustic optical modulators) 17 to 20 disposed on optical axes of the laser beams $B_{21}$, $B_{22}$, $B_{23}$, $B_{24}$, respectively. Thus, the respective laser beams $B_{21}$, $B_{22}$, $B_{23}$, $B_{24}$ are modulated in response to the image signals from a control unit (not shown) for controlling the optical beam scanner. The structure and operation of the optical modulation elements 17 to 20 are well known to these skilled in the art, and hence redundant description is omitted. Further, two polarizing beam splitter 21, 22 and a non-polarizing beam splitter 23 are provided in the optical modulator system 13, so that modulated laser beams $B_{21}'$, $B_{22}'$, $B_{23}'$, $B_{24}'$ are bundled, to generate a multibeam $B_4$ consisting of them which are not parallel each other.

The multibeam $B_4$ outgoing from the opitcal modulator system 13 are reflected by reflecting mirrors 24, 25, and then projected onto a polygon mirror 28, which is rotated at a constant angular velocity, through a beam expander 26 and a cylindrical lens 27. A multibeam $B_5$ deflected by the polygon mirror 28 is focused on a photosensitive material (not shown), which is wound on a rotating cylinder 31, by the lens system 29 as shown in FIG. 6 and a cylindrical lens 30, thereby to record a desired image on the photosensitive material.

On the other hand, the reference beam $B_3$ is projected onto a reflecting mirror 33 disposed in the vicinity of the cylindrical lens 27 through a beam expander 32. A reference beam $B_3'$ reflected by the reflecting mirror 33 enters the polygon mirror 28 through the cylindrical lens 27, and is then directed by the lens system 29 and the cylindrical lens 30 toward a reflecting mirror 34. Thus, the multibeam $B_5$ impinges on the photosensitive material provided on the rotating cylinder 31, while only the corresponding reference beam $B_3'$ is reflected by the reflecting mirror 34 onto a linear encoder 35 which is disposed substantially parallel to the scanning line on the photosensitive material.

The lens system 29 is structured as shown in FIG. 6 and satisfies the above inequalities (1) to (3), so as to have a telecentric characteristic. Therefore, the image is recorded on the photosensitive material in high accuracy. Further, the lens system has also an excellent $f\text{-}\sin\theta$ characteristic. Thus, each scanning locus of the respective laser beams forming the multibeam $B_5$ is made straight. Consequently, the image can be recorded on the photosensitive material not only in high accuracy but also in high quality.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A lens system for an optical beam scanner which scans a plurality of optical beams on a recording surface, said lens system comprising:
   (a) a first lens group having an entrance pupil, said first lens group including:
   (a−1) a first lens in the form of a meniscus having a positive power, said first lens having a concave surface which is directed to said entrance pupil;
   (a−2) a second lens having a negative power;
   (a−3) a third lens in the form of a meniscus having a positive power; and
   (a−4) a fourth lens having a positive power; and
   (b) a second lens group including a fifth lens having a positive power;
   wherein said first through fifth lenses are successively disposed in order from said entrance pupil side; and
   wherein said lens system satisfies the following relationships:

$$0.6 < (r_2/r_3) \leq 2.1$$

$$-0.43 < (f_2/f) < -0.21$$

$$1.3 < (f_5/f) \leq 2.6$$

where $r_2$ is a radius of curvature of a surface of said first lens, which is directed to said recording surface; $r_3$ is a radius of curvature of a surface of said second lens, which is directed to said entrance pupil; $f_2$ is a focal length of said second lens; $f_5$ is a focal length of said fifth lens; and $f$ is a focal length of the lens system.

2. A lens system in accordance with claim 1, wherein said fifth lens is a plano-convex lens having a flat surface which is directed to said fourth lens.

3. An optical beam scanner for scanning a plurality of optical beams on a recording surface, said optical beam scanner comprising:
   a light source for generating the plurality of optical beams;
   a deflector for deflecting the optical beam outgoing from said light source; and
   a lens system for imaging the optical beams deflected by said deflector on said recording surface, said lens system comprising: (a) a first lens group having an entrance pupil, which includes: (a−1) a first lens in the form of a meniscus having a positive power, said first lens having a concave surface which is directed to said entrance pupil; (a−2) a second lens having a negative power; (a−3) a third lens in the form of a meniscus having a positive power; and (a−4) a fourth lens having a positive power; and (b) a second lens group including a fifth lens having a positive power;
   wherein said first through fifth lenses are successively disposed in order from said entrance pupil side; and
   wherein said lens system satisfies the following relationships:

$$0.6 < (r_2/r_3) \leq 2.1$$

$$-0.43 < (f_2/f) < -0.21$$

$$1.3 < (f_5/f) \leq 2.6$$

where $r_2$ is a radius of curvature of a surface of said first lens, which is directed to said recording surface; $r_3$ is a radius of curvature of a surface of said second lens, which is directed to said entrance pupil; $f_2$ is a focal length of said second lens; $f_5$ is a focal length of said fifth lens; and $f$ is a focal length of the lens system.

* * * * *